United States Patent
Tsukada et al.

(10) Patent No.: US 9,577,299 B2
(45) Date of Patent: Feb. 21, 2017

(54) AIR CELL

(71) Applicant: NISSAN MOTOR CO., LTD., Kanagawa (JP)

(72) Inventors: Yoshiko Tsukada, Yokohama (JP); Atsushi Miyazawa, Kamakura (JP); Mori Nagayama, Yokohama (JP); Yasuhiro Numao, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 89 days.

(21) Appl. No.: 14/379,410

(22) PCT Filed: Feb. 14, 2013

(86) PCT No.: PCT/JP2013/053544
§ 371 (c)(1),
(2) Date: Aug. 18, 2014

(87) PCT Pub. No.: WO2013/125444
PCT Pub. Date: Aug. 29, 2013

(65) Prior Publication Data
US 2015/0086882 A1  Mar. 26, 2015

(30) Foreign Application Priority Data

Feb. 22, 2012 (JP) .................. 2012-036111
Feb. 12, 2013 (JP) .................. 2013-024229

(51) Int. Cl.
*H01M 12/02* (2006.01)
*H01M 12/08* (2006.01)
*H01M 2/02* (2006.01)

(52) U.S. Cl.
CPC ............. *H01M 12/08* (2013.01); *H01M 2/024* (2013.01); *H01M 2/0245* (2013.01);
(Continued)

(58) Field of Classification Search
CPC ...... H01M 12/08; H01M 12/02; H01M 2/024; H01M 2/0245; H01M 2/0255; H01M 2220/20
See application file for complete search history.

(56) References Cited

U.S. PATENT DOCUMENTS 3,505,113 A * 4/1970 Merten ................. H01M 10/30
429/223
4,950,561 A 8/1990 Niksa et al.
(Continued)

FOREIGN PATENT DOCUMENTS

CN  1427499 A  7/2003
CN  1196219 C  4/2005
(Continued)

OTHER PUBLICATIONS

Landi, H.P., et al. "A Novel Air Electrode", Fuel Cell Systems-II, Chapter 2, pp. 13-23, 1969.*

*Primary Examiner* — Miriam Stagg
*Assistant Examiner* — Lilia V Nedialkova
(74) *Attorney, Agent, or Firm* — Young Basile Hanlon & MacFarlane, P.C.

(57) ABSTRACT

An air cell includes a positive electrode and a negative electrode, and an outer frame member located at outer peripheries of the positive electrode and the negative electrode. The positive electrode and the outer frame member are integrally joined together. An assembled battery includes a plurality of air cells, the air cells being stacked on top of each other. This configuration can increase mechanical strength and improve sealing performance for an electrolysis solution in the positive electrode. In addition, a reduction in thickness of the entire air cell can be achieved so that the assembled battery suitable for use in a vehicle can be provided.

12 Claims, 10 Drawing Sheets

(52) U.S. Cl.
CPC ......... *H01M 2/0255* (2013.01); *H01M 12/02* (2013.01); *H01M 2220/20* (2013.01)

(56) References Cited

U.S. PATENT DOCUMENTS

| | | | | |
|---|---|---|---|---|
| 5,599,637 | A | * 2/1997 | Pecherer | ................ H01M 4/02 |
| | | | | 29/2 |
| 6,332,899 | B1 | 12/2001 | Pong | |
| 2003/0017376 | A1 | * 1/2003 | Tsai | ................... H01M 6/5038 |
| | | | | 429/404 |
| 2012/0021303 | A1 | * 1/2012 | Amendola | .............. H01M 4/42 |
| | | | | 429/406 |

FOREIGN PATENT DOCUMENTS

| | | | |
|---|---|---|---|
| JP | 58-068673 U | 5/1983 | |
| JP | 03-037972 A | 2/1991 | |
| JP | 2000-173679 A | 6/2000 | |
| TW | I241731 B | 10/2005 | |

\* cited by examiner

FIG. 1
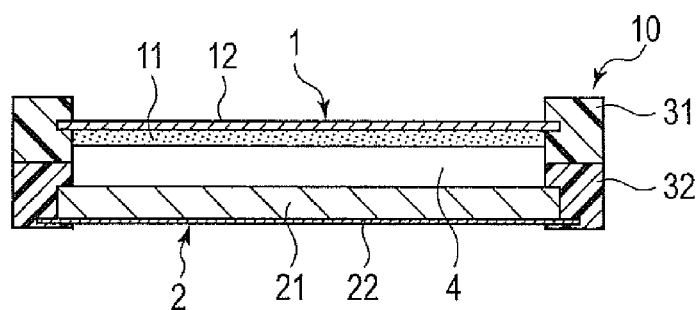
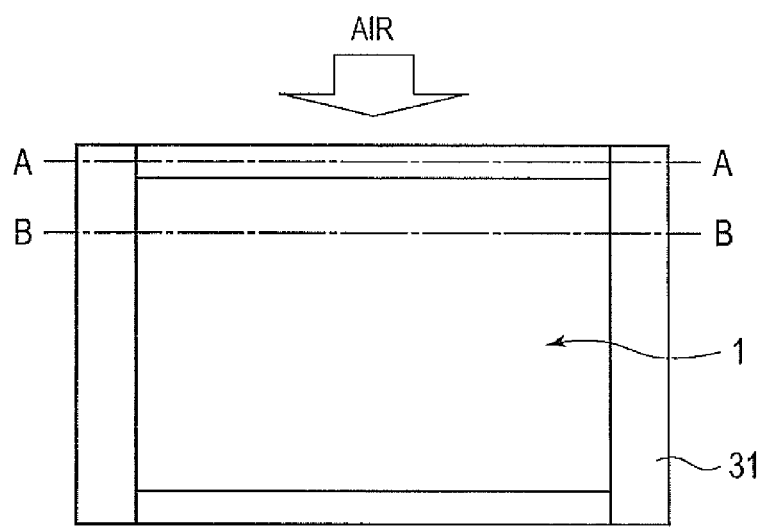
FIG. 2A
FIG. 2B
FIG. 2C
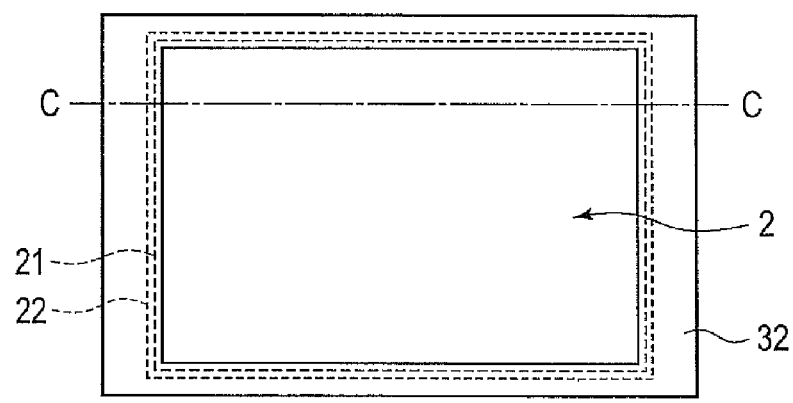

AIR CELL

CROSS REFERENCE TO RELATED APPLICATIONS

The present application claims priority to Japanese Patent Application Nos. 2012-036111, filed Feb. 22, 2012 and 2013-024229, filed Feb. 12, 2013, each incorporated herein in its entirety.

TECHNICAL FIELD

The present invention relates to an air cell using oxygen as a positive electrode active material and particularly relates to an air cell suitable for an assembled battery in which a plurality of such air cells is stacked.

BACKGROUND

There is known an air cell, for example, as described in Japanese Unexamined Patent Application Publication No. 03-037972. The air cell described in Japanese Unexamined Patent Application Publication No. 03-037972 includes a flat battery case composed of a plurality of parts, air cathodes (positive electrodes) placed on front and back surfaces of the battery case, and an anode (a metal negative electrode) housed in the battery case. The air cathodes detachably installed in the battery case push rubber gaskets or the like provided in the battery case so as to be sealed therein. Similarly, the anode detachably housed in the battery case is inserted from a side portion of the battery case so as to be sealed therein in the same manner as the air cathodes. Namely, the air cathodes and the anode push the rubber gaskets or the like to keep the sealing performance for convenience of replacement.

SUMMARY

In recent years, advances in development of air cells used for power supplies or auxiliary power supplies in vehicles such as motor vehicles are being made. Air cells mounted in a vehicle are required to have a simple structure and a reduced thickness to constitute an assembled battery in which the air cells are connected in series in view of output performance and capacity necessary for the vehicle, installation in a small space, and the like. However, the air cell disclosed in Patent Literature 1 is not suitable for use in a vehicle because the air cell does not have a structure capable of being connected directly to each other when the plural air cells are stacked and because the air cell has a complicated structure which requires a large number of parts.

Further, in such an air cell, the positive electrodes, each being made of a thin air-permeable material, have lower mechanical strength than the negative electrode made of metal. Therefore, when the structure of the air cell is simplified and the thickness thereof is reduced, it is considered that the positive electrodes are bent when the plural air cells are stacked on top of each other so that stress may be concentrated at outer peripheries of the positive electrodes. Further, the structure of the conventional air cell in which the positive electrodes push the rubber gaskets or the like to keep the sealing performance, may cause a reduction in sealing performance for an electrolysis solution accompanied with deformation of the positive electrodes.

The present invention has been made in view of the above-described conventional problems. An object of the present invention is to provide a thin air cell capable of achieving an increase in mechanical strength of at least a positive electrode of positive and negative electrodes and improving sealing performance for an electrolysis solution so as to be suitably mounted in a vehicle.

An air cell according to an aspect of the present invention includes a positive electrode and a negative electrode, and an outer frame member located at outer peripheries of the positive electrode and the negative electrode. The positive electrode and the outer frame member are integrally joined together.

BRIEF DESCRIPTION OF DRAWINGS

FIG. 1 is a cross-sectional view showing an example of an air cell according to an embodiment of the present invention.

FIG. 2($a$) is a plan view of a positive electrode of the air cell shown in FIG. 1, FIG. 2($b$) is a cross-sectional view taken along the line A-A in FIG. 2($a$), and FIG. 2($c$) is a plan view of a negative electrode.

DESCRIPTION OF EMBODIMENTS

Figure 3:
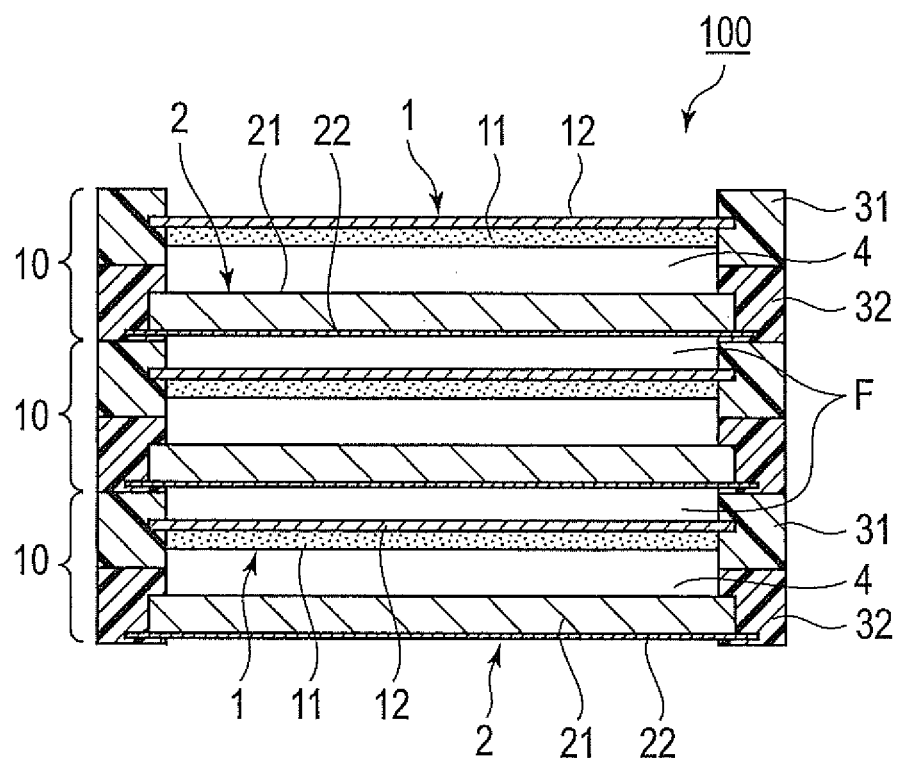
FIG. 3 is a cross-sectional view showing an assembled battery in which the plural air cells shown in FIG. 1 are stacked.

Hereinafter, an air cell according to the embodiment of the present invention will be explained with reference to the drawings. It should be noted that dimensional ratios in the drawings are magnified for convenience of explanation and may be different from actual ratios.

The air cell according to the present embodiment is a cell in which oxygen in air comes into contact with a positive electrode so that the oxygen is used as a positive electrode active material. As shown in FIG. 1 and FIG. 2, the air cell 10 has a rectangular plate-like shape. The air cell 10 includes positive and negative electrodes (a positive electrode 1 and a negative electrode 2), and an outer frame member (31, 32) positioned at outer peripheries of the positive electrode 1 and the negative electrode 2. The air cell 10 has a configuration in which at least the positive electrode 1 and the outer frame member are joined together. Note that FIG. 1 shows a cross section taken along the line B-B in the positive electrode 1 shown in FIG. 2(a) and a cross section taken along the line C-C in the negative electrode 2 shown in FIG. 2(c).

According to the present embodiment, the outer frame member include a first outer frame member 31 integrally joined to the positive electrode 1 and a second outer frame member 32 integrally joined to the negative electrode 2. The first outer frame member 31 and the second outer frame member 32 are airtightly joined together by welding or the like so as to form a storage portion 4 for keeping an electrolysis solution between the positive electrode 1 and the negative electrode 2. Although not shown in the figures, an electrolysis solution injection portion including a valve or the like may be formed in one of or both the first outer frame member 31 and the second outer frame member 32. Accordingly, the injection-type air cell 10 is obtained.

The first outer frame member 31 and the second outer frame member 32 each have a thickness greater than that of the respective electrodes (the positive electrode 1 and the negative electrode 2). In particular, the first outer frame member 31 joined to the positive electrode 1 has a reduced thickness on the upper and lower sides shown in FIG. 2(a) so as to have the same plane as the positive electrode surface as shown in FIG. 2(b). Therefore, when the plural air cells 10 are stacked on top of each other to compose an assembled battery 100, as shown in FIG. 3, air flow paths F in an in-plane direction (in a direction along the surface) indicated by the arrow in FIG. 2 are formed on the surface side of the respective positive electrodes 1.

The first outer frame member 31 and the second outer frame member 32 preferably have an electric insulation property. The first outer frame member 31 and the second outer frame member 32 are preferably made of resin having electrolysis solution resistance such as polypropylene (PP) or engineering plastic, which contributes to a reduction in weight. Further, the first outer frame member 31 and the second outer frame member 32 may employ fiber reinforced plastic (FRP) in which resin and reinforcing fiber such as carbon fiber and glass fiber are combined together in order to further increase the mechanical strength.

The positive electrode 1 comes into contact with oxygen in air and uses the oxygen as a positive electrode active material. In particular, the positive electrode 1 includes a catalyst layer 11 including a gas diffusion layer, and a water-repellent layer 12 located on the positive electrode surface (on the upper surface of the air cell in FIG. 1). The catalyst layer 11 is made by electric conductive porous material. The catalyst layer 11 has a constitution in which a catalyst such as manganese dioxide is supported in an electric conductive porous body containing, for example, a carbon material and binder resin.

The water-repellent layer 12 is a member having a liquid-tight property with respect to the electrolysis solution and air-permeability with respect to oxygen. The water-repellent layer 12 employs a water-repellent film such as fluorine resin in order to prevent the electrolysis solution from leaking out. The water-repellent layer 12 also has a large number of fine pores so as to supply the oxygen to the catalyst layer 11.

The negative electrode 2 includes a negative electrode metal layer 21 containing metal serving as a negative electrode active material, and a negative electrode current collecting layer 22 located on the negative electrode surface (on the lower surface of the air cell in FIG. 1). The metal serving as the negative electrode active material is preferably pure metal selected from the group consisting of lithium (Li), aluminum (Al), iron (Fe), zinc (Zn), and magnesium (Mg). The metal serving as the negative electrode active material is also preferably an alloy containing at least one element selected from the group consisting of lithium (Li), aluminum (Al), iron (Fe), zinc (Zn), and magnesium (Mg). In the present embodiment, aluminum (Al) is used for the negative electrode metal layer 21.

The negative electrode current collecting layer 22 is an electric conductive member containing a material capable of preventing the electrolysis solution from leaking out. The negative electrode current collecting layer 22 preferably contains at least one material selected from the group consisting of stainless steel, copper, a copper alloy, and a material obtained in a manner such that a surface of a metal material is plated with metal having corrosion resistance. The negative electrode current collecting layer 22 more preferably contains a material having higher electrolysis solution resistance than the negative electrode metal layer 21. In the present embodiment, copper foil is used for the negative electrode current collecting plate 22.

The electrolysis solution held between the positive electrode 1 and the negative electrode 2 is preferably an aqueous solution or a non-aqueous electrolysis solution mainly containing potassium hydroxide (KOH) or chloride. Here, the electrolysis solution may be replaced with a solid or gel electrolyte.

The air cell 10 according to the present embodiment includes the first outer frame member 31 and the second outer frame member 32 made of resin and integrally formed at the respective outer peripheries of the electrodes (the positive electrode 1 and the negative electrode 2) by, for example, injection molding. Therefore, the positive electrode 1 and the negative electrode 2 are integrated with the respective outer frame members (31, 32) in a manner such that the respective outer peripheries of the electrodes are entirely buried in the resin. This configuration can improve the mechanical strength of the electrodes and the sealing performance for the electrolysis solution.

More specifically, the first outer frame member 31 in the air cell 10 according to the present embodiment is integrated with the outer periphery of the positive electrode 1 so as to prevent the leakage of the electrolysis solution by the joined portion of the positive electrode 1 and the first outer frame member 31. The outer periphery of the positive electrode 1 and the first outer frame member 31 may be joined together with, in particular, an adhesive agent. Alternatively, the outer periphery of the positive electrode 1 may be buried in the first outer frame member 31 so as to be joined together. Further, part of the outer periphery of the positive electrode 1 may be joined to the first outer frame member 31 with an adhesive agent, and the other part of the outer periphery of the positive electrode 1 may be buried in the first outer frame member 31 so as to be joined together. Due to such a configuration, the outer periphery of the positive electrode 1 is supported by the first outer frame member 31, and the strength of the positive electrode 1 can be increased. In addition, the configuration in which the outer periphery of the positive electrode 1 and the first outer frame member 31 are joined together can also prevent the leakage of the electrolysis solution.

In the air cell 10 according to the present embodiment, at least part of the outer periphery of the positive electrode 1 is required to be integrated with the outer frame member. In view of the prevention of the leakage of the electrolysis solution, however, the entire periphery of the positive electrode 1 is preferably integrated with the outer frame member. The connection between the outer periphery of the positive electrode 1 and the outer frame member is not limited to the use of the adhesive agent or the buried state and may be achieved by, for example, welding.

Similarly, the second outer frame member 32 in the air cell 10 according to the present embodiment is integrated with the outer periphery of the negative electrode 2 so as to prevent the leakage of the electrolysis solution by the joined portion of the positive electrode 2 and the second outer frame member 32. The outer periphery of the negative electrode 2 and the second outer frame member 32 may be joined together with, in particular, an adhesive agent. Alternatively, the outer periphery of the negative electrode 2 may be buried in the second outer frame member 32 so as to be joined together. Further, part of the outer periphery of the negative electrode 2 may be joined to the second outer frame member 32 with an adhesive agent, and the other part of the outer periphery of the negative electrode 2 may be buried in the second outer frame member 32 so as to be joined together. Due to such a configuration, the outer periphery of the negative electrode 2 is supported by the second outer frame member 32, and the strength of the negative electrode 2 can be increased. In addition, the configuration in which the outer periphery of the negative electrode 2 and the second outer frame member 32 are joined together can also prevent the leakage of the electrolysis solution.

In the air cell 10 according to the present embodiment, at least part of the outer periphery of the negative electrode 2 is preferably integrated with the outer frame member. In view of the prevention of the leakage of the electrolysis solution, however, the entire periphery of the negative electrode 2 is more preferably integrated with the outer frame member. The connection between the outer periphery of the negative electrode 2 and the outer frame member is not limited to the use of the adhesive agent or the buried state and may be achieved by, for example, welding.

As described above, in the air cell 10, the negative electrode 2 includes the negative electrode metal layer 21 made of aluminum and the negative electrode current collecting layer 22 made of copper foil having higher electrolysis solution resistance than the negative electrode metal layer 21. At least the negative electrode current collecting layer 22 of the negative electrode metal layer 21 and the negative electrode current collecting layer 22 is preferably integrated with the second outer frame member 32. In FIG. 1 and FIG. 2(c), both the negative electrode metal layer 21 and the negative electrode current collecting layer 22 are integrated with the second outer frame member 32. Namely, the outer peripheries of both the negative electrode metal layer 21 and the negative electrode current collecting layer 22 are buried in the second outer frame member 32.

In the air cell 10, the negative electrode metal layer 21 and the negative electrode current collecting layer 22 are integrated together. That is, the negative electrode metal layer 21 and the negative electrode current collecting layer 22 are stacked and joined together. As shown in FIG. 1 and FIG. 2(c), the negative electrode current collecting layer 22 has a larger outer periphery extending to the outside of the negative electrode metal layer 21 in a planar view.

The air cell 10 having the configuration described above can decrease the number of parts so as to have a remarkably simple and thin structure. When the plural air cells 10 are stacked on top of each other, the air cells 10 can be connected in series, without using wires, in a manner such that the outer frame members (31, 32) are provided with connecting members or an electric conductive member is inserted between the air cells 10 adjacent to each other. As a result, the assembled battery in which the air cells 10 are stacked is particularly suitable for use in a power supply mounted in a motor vehicle.

Further, since at least the positive electrode 1 of the two electrodes in the air cell 10 is integrated with the first outer frame member 31, the positive electrode 1 is reinforced by the first outer frame member 31 so as to improve the mechanical strength and the sealing performance for the electrolysis solution. Accordingly, a further reduction in thickness of the air cell may be achieved. In addition, since the internal resistance decreases in association with the reduction in thickness, higher output performance of the air cell 10 can also be ensured.

When the plural air cells 10 are stacked on top of each other, the positive electrode 1 may be bent so that stress may be concentrated at the outer periphery thereof. However, since the air cell 10 has high mechanical strength and sealing performance, a risk of loss of the sealing performance for the electrolysis solution in association with deformation of the positive electrode 1, can be reduced.

In the air cell 10 shown in FIG. 1, the negative electrode 2 and the second outer frame member 32 are also integrally joined together, in addition to the positive electrode 1 and the first outer fame member 31 joined together. This improves the mechanical strength in the negative electrode 2 and the sealing performance for the electrolysis solution. Accordingly, the negative electrode 2 and the second outer frame member 32 in combination with the positive electrode 1 and the first outer frame member 31 can contribute to achieving a further reduction in thickness and higher output performance.

Further, in the air cell 10, the first outer frame member 31 and the second outer frame member 32 are made of resin and integrated with the respective outer peripheries of the positive and negative electrodes (1, 2). Therefore, the air cell 10 can ensure sufficient mechanical strength even if the thickness is reduced and further improve the sealing performance for the electrolysis solution, which increases the productivity.

Further, in the air cell 10, at least the negative electrode current collecting layer 22 of the negative electrode metal layer 21 and the negative electrode current collecting layer 22 composing the negative electrode 2, is integrated with the second outer frame member 32. Therefore, the negative electrode current collecting layer 22 can stably keep the sealing performance for the electrolysis solution even if the negative electrode metal layer 21 is worn out in association with repeated power generation. In addition, since the air cell 10 employs the negative electrode current collecting layer 22 containing the material having higher electrolysis solution resistance than the negative electrode metal layer 21, the sealing performance for the electrolysis solution can be further improved.

The material in the negative electrode current collecting layer 22 does not necessarily have higher electrolysis solution resistance than the negative electrode metal layer 21, and other materials may be used. That is, since the time for power generation and a worn level of the negative electrode metal layer 21 in the air cell 10 are preliminarily figured out, the material is only required to prevent the leakage of the electrolysis solution after the power generation. Therefore, the negative electrode current collecting layer 22 may contain the same material as the negative electrode metal layer 21 as long as the thickness and the like is determined as appropriate. When the negative electrode current collecting layer 22 contains the material having higher electrolysis solution resistance than the negative electrode metal layer 21, high sealing performance for the electrolysis solution can surely be ensured so that a highly secure air cell can be provided.

Further, in the air cell 10, the negative electrode metal layer 21 and the negative electrode current collecting layer 22 in the negative electrode 2 are integrated together. Accordingly, the negative electrode metal layer 21 and the negative electrode current collecting layer 22 are reinforced with each other, and the contact resistance therebetween decreases so that the negative electrode 2 having a reduced thickness and high strength with a small amount of current collecting loss can be obtained.

In the air cell 10, the negative electrode current collecting layer 22 has a larger outer periphery extending to the outside of the negative electrode metal layer 21 in a planar view. Namely, the negative electrode current collecting layer 22 sufficiently covers the entire negative electrode metal layer 21 so as to further improve the sealing performance for the electrolysis solution. In addition, since the area in which the outer periphery of the negative electrode current collecting layer 22 is buried in the first outer frame member 32 increases, the leakage of the electrolysis solution can be further prevented.

FIG. 4 to FIG. 13 show the other examples of the air cell of the present embodiment. It should be noted that in the explanations of the following embodiments, the same elements as those of the above embodiments are indicated by the same reference numerals, and overlapping explanations thereof are not repeated.

Figure 4:
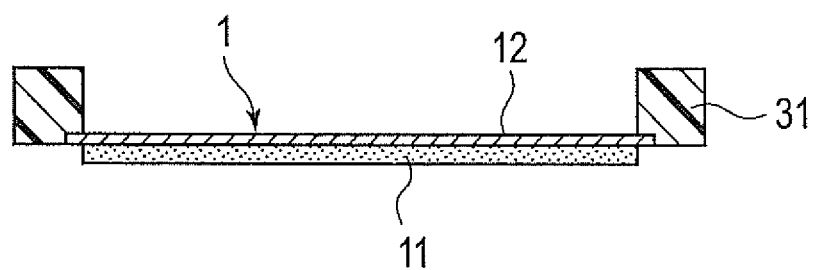
FIG. 4 is a cross-sectional view showing another example of the positive electrode of the air cell according to the present embodiment.

The positive electrode 1 of the air cell shown in FIG. 4 is integrally joined to the first outer frame member 31. Although the outer periphery of the positive electrode 1 is buried in the first outer frame member 31 made of resin in the above-descried embodiment, the outer periphery of the positive electrode 1 is inserted into part of the first outer frame member 31 to be joined together by adhesion or welding in this embodiment. The air cell including this positive electrode 1 can improve the mechanical strength of the positive electrode 1 and the sealing performance for the electrolysis solution and can contribute to achieving a reduction in thickness and higher output performance of the air cell, as in the case of the above-described embodiment.

In the positive electrode 1 of the air cell shown in FIG. 5, at least part of the first outer frame member 31 has an electrode fixing structure for mechanically fixing the positive electrode 1. The positive electrode 1 further includes a reinforcing layer 5 located between the water-repellent layer 12 and the catalyst layer 11. Namely, the air cell according to this embodiment may have a configuration in which at least part of the first outer frame member 31 and the second outer frame member 32 have the electrode fixing structure for mechanically fixing the respective electrodes (1, 2), and in which at least the positive electrode 1 includes the reinforcing layer 5.

The reinforcing layer 5 is a member having electric conductivity and air-permeability. As an example of the reinforcing layer 5, a porous metal plate or a metal mesh such as perforated metal, or a porous resin plate or a resin mesh covered with metal such as plating on the surface thereof, may be used.

Figure 5A:
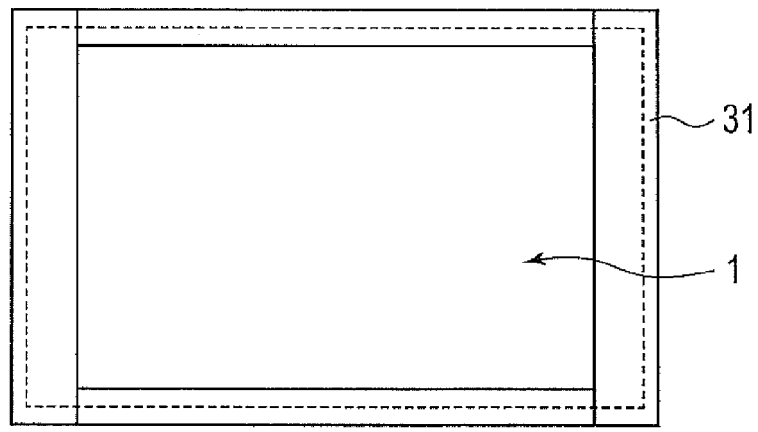
FIG. 5($a$) is a plan view showing still another example of the positive electrode of the air cell according to the present embodiment, and FIG. 5($b$) to FIG. 5($e$) are cross-sectional views showing examples of an electrode fixing structure.

The electrode fixing structure can fulfill predetermined functions in the rectangular positive electrode 1 shown in FIG. 5(a) when applied at least to the four corners thereof. In particular, in the thin air cell, since a central portion of the positive electrode 1 is bent when the plural air cells are stacked, stress is concentrated at the four corners in the outer periphery of the positive electrode 1 particularly having a rectangular shape. Therefore, the electrode fixing structure is preferably provided at least at the four corners of the first outer frame member 31, more preferably provided along the entire outer periphery of the first outer frame member 31. FIG. 5(b) to FIG. 5(e) show specific examples of the electric fixing structure.

Figure 5B:
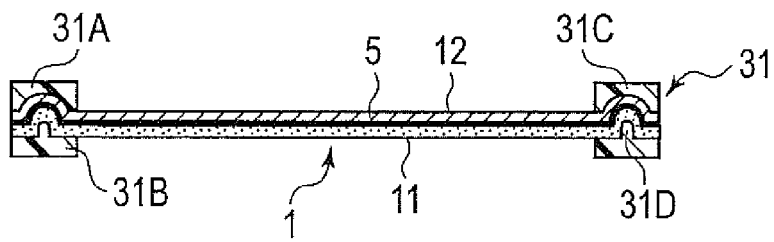

According to the electrode fixing structure shown in FIG. 5(b), the first outer frame member 31 is divided into an upper member 31A and a lower member 31B. The upper member 31A and the lower member 31B are provided, on the respective surfaces facing each other, with a recess 31C and a projection 31D respectively, which engage with each other. In this electrode fixing structure, the outer periphery of the positive electrode 1 is inserted between the upper member 31A and the lower member 31B in a manner such that the recess 31C and the projection 31D engage with each other, and the upper member 31A and the lower member 31B are then joined by bonding or the like. As a result, the positive electrode 1 and the first outer frame member 31 are integrally joined and fixed together.

Figure 5C:
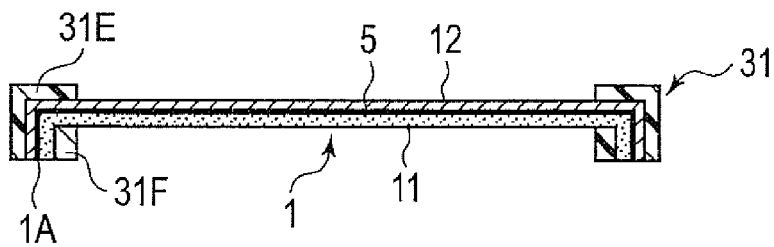

According to the electrode fixing structure shown in FIG. 5(c), the first outer frame member 31 is divided into an outer member 31E having a hook shape in cross section and an inner member 31F housed therein. Further, a bent portion 1A is formed in the outer periphery of the positive electrode 1. In this electrode fixing structure, the bent portion 1A of the positive electrode 1 is inserted between the outer member 31E and the inner member 31F, and the outer member 31E and the inner member 31F are then joined by bonding or the like. As a result, the positive electrode 1 and the first outer frame member 31 are integrally joined and fixed together.

Figure 5D:
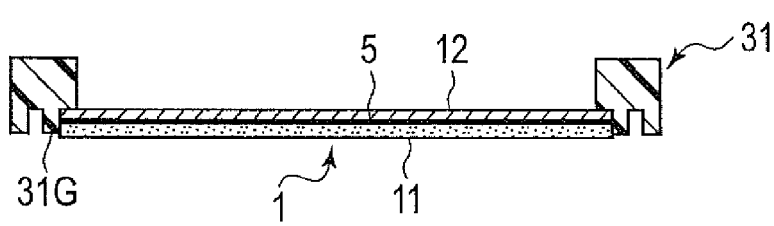

According to the electrode fixing structure shown in FIG. 5(d), the outer periphery of the positive electrode 1 and the first outer frame member 31 are each provided with engaging portions 31G engaging with each other, such as concavity and convexity portions, holes, and projections. In this electrode fixing structure, the positive electrode 1 engages with the first outer frame member 31 with the engaging portions 31G so as to be joined together by bonding or the like. As a result, the positive electrode 1 and the first outer frame member 31 are integrally joined and fixed together.

Figure 5E:
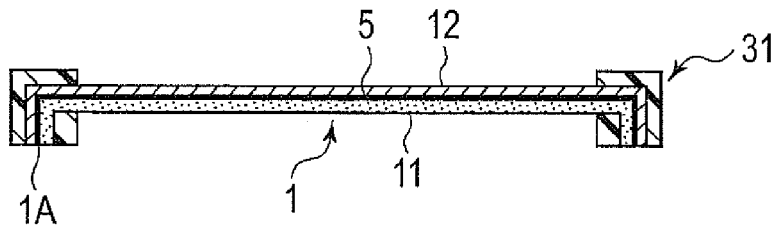
Figure 6A:
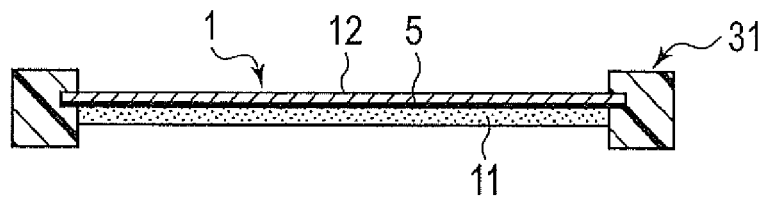
FIG. 6($a$) to FIG. 6($d$) are other examples of the positive electrode of the air cell according to the present embodiment, and FIG. 6($e$) is a plan view showing an arrangement of a reinforcing member.
Figure 6B:
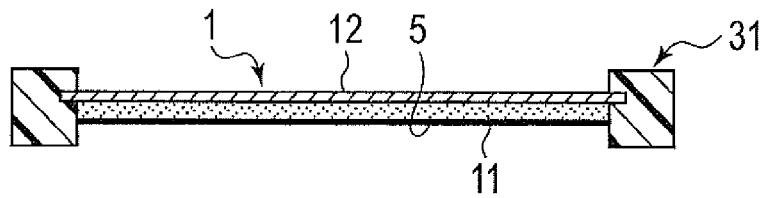
Figure 6C:
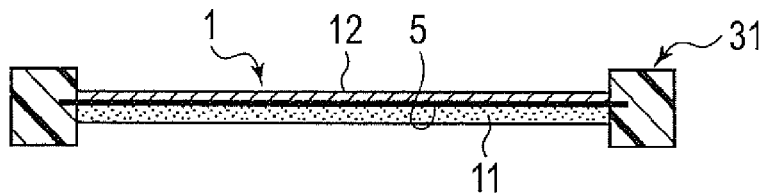
Figure 6D:
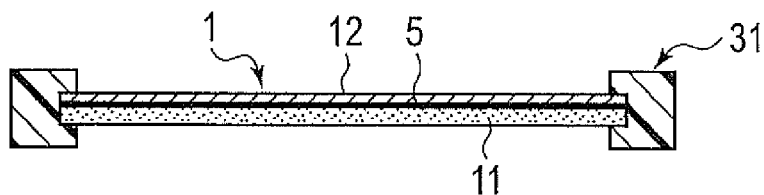
Figure 6E:
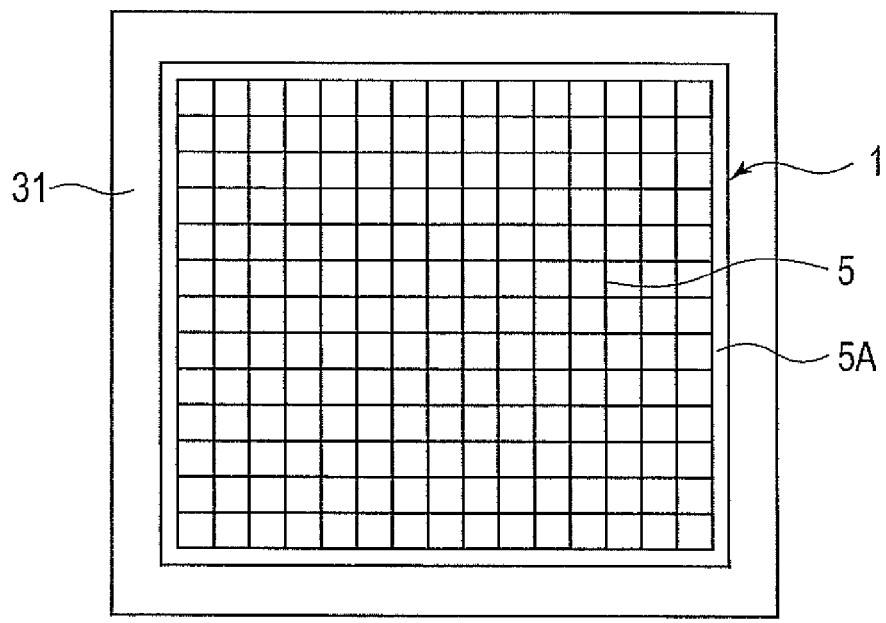

According to the electrode fixing structure shown in FIG. 5(e), the outer periphery of the positive electrode 1 is provided with the bent portion 1A and further integrated with the first outer frame member 31 made of resin. As a result, the bent portion 1A of the positive electrode 1 is buried in the resin so that the positive electrode 1 and the first outer frame member 31 are integrally joined and fixed together.

The air cell having the electrode fixing structure described above can achieve the same effects as the above-described embodiment. Further, the positive electrode 1 and the first outer frame member 31 are mechanically connected and integrated together. Accordingly, sufficient mechanical strength and sealing performance for the electrolysis solution can be ensured even if the thickness of the air cell is reduced. The electrode fixing structure may be selected as appropriate depending on the manufacture process of the electrode.

In addition, the air cell including the positive electrode 1 according to this embodiment increases the mechanical strength due to the reinforcing layer 5. As a result, the positive electrode 1 is prevented from being bent when the plural air cells are stacked so as to greatly reduce stress concentration and achieve a reduction in thickness, higher output performance and a reduction in weight in the air cell. Moreover, the reinforcing layer 5 having electric conductivity provided in the air cell functions as a current collector so that a reduction in internal resistance can be achieved.

The electrode fixing structure can also be applied, of course, to the connection between the negative electrode 2 and the second outer frame member 32. Therefore, since the mechanical strength and the sealing performance for the electrolysis solution can be improved as in the case of the positive electrode 1, the electrode fixing structure applied can contribute to an increase in performance of the air cell together with the configuration of the positive electrode 1.

The positive electrode 1 of the air cell shown in FIG. 6 has a configuration in which the water-repellent layer 12, the catalyst layer 11 including the gas diffusion layer, and the reinforcing layer 5 are stacked on top of each other. In addition, at least one of the water-repellent layer 12, the catalyst layer 11 and the reinforcing layer 5 is integrated with the first outer frame member 31.

The positive electrode 1 shown in FIG. 6(*a*) includes the water-repellent layer 12, the reinforcing layer 5 and the catalyst layer 11 arranged in this order from the positive electrode surface. In this positive electrode 1, the outer peripheries of the water-repellent layer 12 and the reinforcing layer 5 are integrated with the first outer frame member 31, and the catalyst layer 11 is placed on the lower surface of the reinforcing layer 5.

The positive electrode 1 shown in FIG. 6(*b*) includes the water-repellent layer 12, the catalyst layer 11 and reinforcing layer 5 arranged in this order from the positive electrode surface. In this positive electrode 1, the outer periphery of the water-repellent layer 12 is integrated with the first outer frame member 31, and the catalyst layer 11 and the reinforcing layer 5 are placed on the lower surface of the water-repellent layer 12.

The positive electrode 1 shown in FIG. 6(*c*) includes the water-repellent layer 12, the reinforcing layer 5 and the catalyst layer 11 arranged in this order from the positive electrode surface. In this positive electrode 1, the outer periphery of the reinforcing layer 5 is integrated with the first outer frame member 31, the water-repellent layer 12 is placed on the upper surface of the reinforcing layer 5, and the catalyst layer 11 is placed on the lower surface of the reinforcing layer 5.

The positive electrode 1 shown in FIG. 6(*d*) includes the water-repellent layer 12, the reinforcing layer 5 and the catalyst layer 11 arranged in this order from the positive electrode surface. In this positive electrode 1, the outer peripheries of all the layers are integrated with the first outer frame member 31.

As described above, the reinforcing layer 5 is preferably made of an air-permeable member such as a porous plate or a mesh. However, in the embodiment shown in FIG. 5 and FIG. 6, the reinforcing layer 5 preferably has a frame portion 5A with no air-permeability as shown in FIG. 6(*e*). The reinforcing layer 5 uses the frame portion 5A as a margin for connection so as to increase adhesion to the water-repellent layer 12 or the catalyst layer 11 adjacent thereto. Further, the connection between the frame portion 5A and the first outer frame member 31 can increase adhesion and sealing performance thereof.

The air cell including the positive electrode 1 shown in FIG. 6 can also greatly improve the mechanical strength and the sealing performance for the electrolysis solution as in the case of the above-described embodiment. In addition, the air cell can greatly decrease the contact resistance among the water-repellent layer 12, the catalyst layer 11 and the reinforcing layer 5 and contribute to further achieving a reduction in thickness, higher output performance and a reduction in weight in the air cell.

Figure 7A:
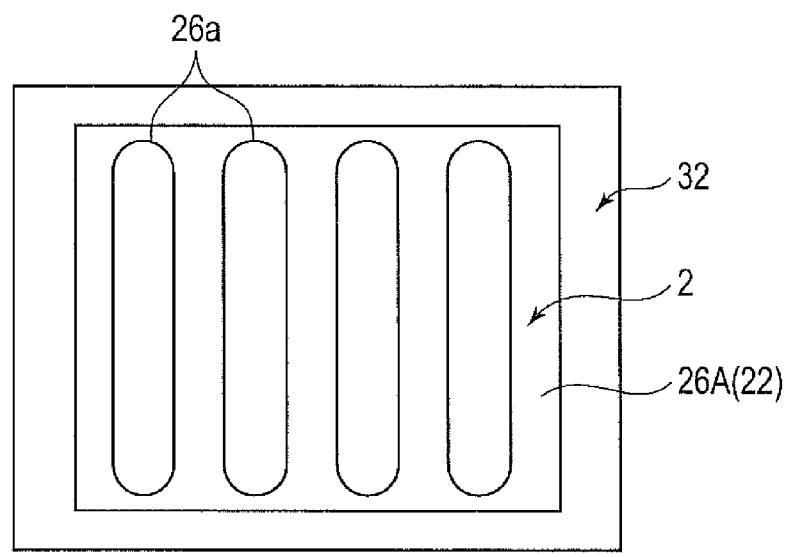
FIG. 7($a$) is a bottom view showing an example of the negative electrode of the air cell according to the embodiment, and FIG. 7($b$) is a cross-sectional view of this negative electrode.
Figure 7B:
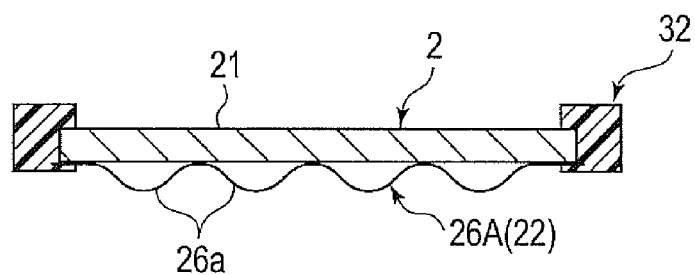

The negative electrode 2 of the air cell shown in FIG. 7 includes the negative electrode current collecting layer 22 which is formed of a negative electrode current collecting member 26A in a manner such that air flow paths F are formed along the surface of the positive electrode 1 of the adjacent air cell when the plural air cells are connected in series. In the negative electrode 2, the outer peripheries of the negative electrode metal layer 21 and the negative electrode current collecting member 26A are integrated with the second outer frame member 32.

The negative electrode current collecting member 26A includes a plurality of elongated protrusions 26*a* projecting on the lower surface thereof arranged in parallel at predetermined intervals. FIG. 7 shows the four elongated protrusions 26*a* arranged in parallel on the lower surface at predetermined intervals. The elongated protrusions 26*a* are formed in such a manner as to extend in the air flow direction indicated in FIG. 2. The negative electrode current collecting member 26A is obtained in a manner such that a metal plate is pressed, in which the opposite side of each of the elongated protrusions 26*a* is formed into a groove.

Figure 8:
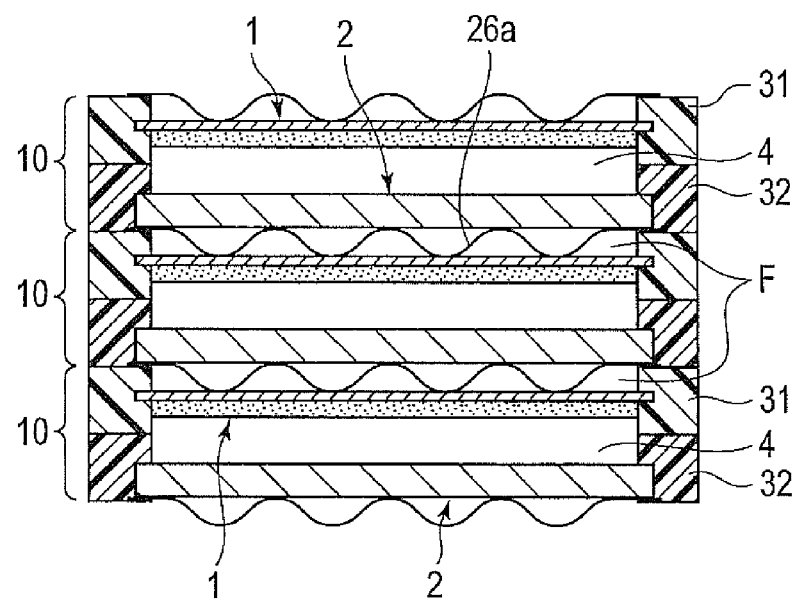
FIG. 8 is a cross-sectional view showing an assembled battery in which a plurality of air cells each using the negative electrode shown in FIG. 7 are stacked.

As shown in FIG. 8, the second outer frame member 32 integrated with the negative electrode 2 is airtightly joined to the first outer frame member 31 integrated with the positive electrode 1 so as to compose the air cell 10. In addition, the storage portion 4 for keeping the electrolysis solution is formed between the positive electrode 1 and the negative electrode 2. The plural air cells 10 are stacked on top of each other to compose the assembled battery 100.

In the above-described assembled battery 100, the positive electrode 1 of the air cell 10 comes into contact with the elongated protrusions 26*a* of the negative electrode current collecting member 26A of the negative electrode 2 adjacent to and located on the positive electrode 1, so as to form the air flow paths F between the respective elongated protrusions 26*a* for the positive electrode 1. Accordingly, the negative electrode current collecting member 26A functions as a spacer and a connector between the positive electrode 1 and the negative electrode 2 adjacent to each other.

Figure 9A:
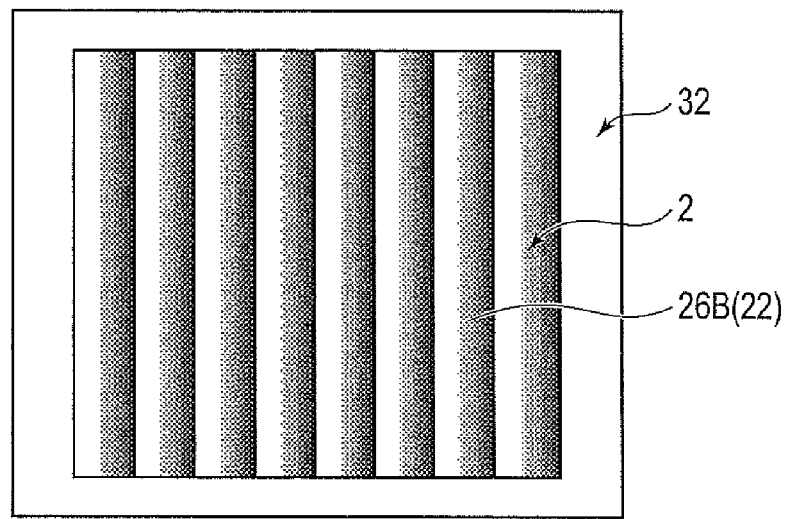
FIG. 9($a$) is a bottom view showing another example of the negative electrode of the air cell according to the present embodiment, and FIG. 9($b$) is a cross-sectional view of this negative electrode.
Figure 9B:
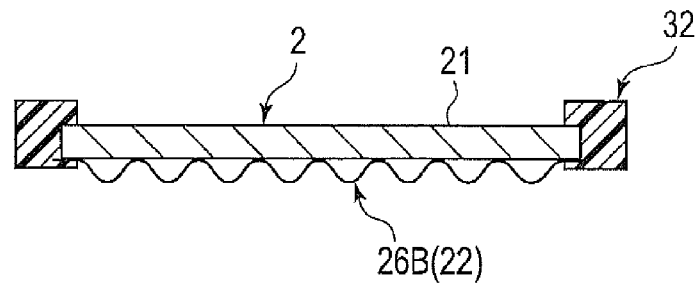

The negative electrode 2 of the air cell shown in FIG. 9 includes the negative electrode current collecting layer 22 which is formed of a negative electrode current collecting member 26B in a manner such that the air flow paths F are formed along the surface of the positive electrode 1 of the adjacent air cell when the plural air cells are connected in series. In the negative electrode 2, the outer peripheries of the negative electrode metal layer 21 and the negative electrode current collecting member 26B are integrated with the second outer frame member 32.

The negative electrode current collecting member 26B according to this embodiment is formed into a corrugated shape in cross section. The negative electrode 2 includes this negative electrode current collecting member 26B. The negative electrode current collecting member 26B also forms the air flow paths F for the positive electrode 1 and functions as a spacer and a connector as in the case of the above-described embodiments.

Figure 10A:
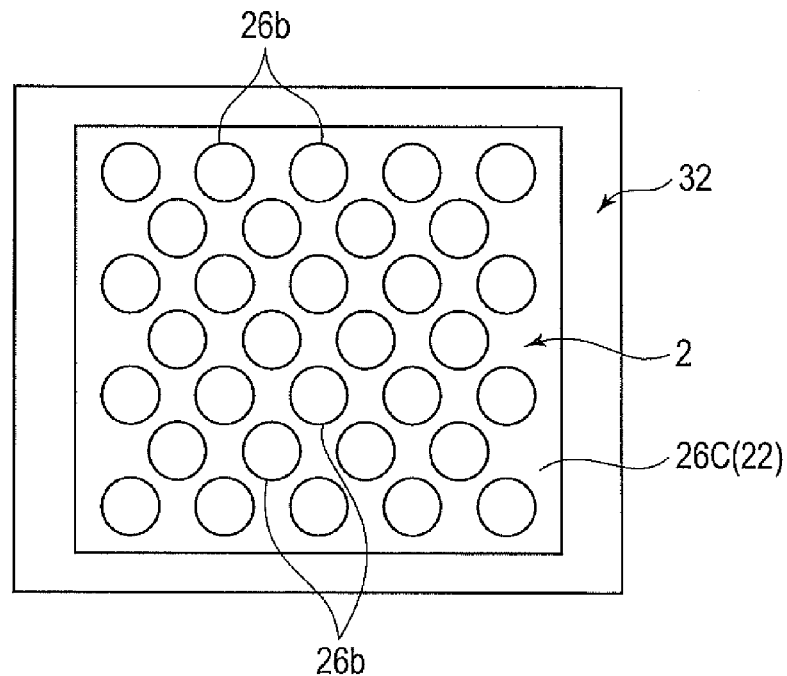
FIG. 10($a$) is a bottom view showing still another example of the negative electrode of the air cell according to the present embodiment, and FIG. 10($b$) is a cross-sectional view of this negative electrode.
Figure 10B:
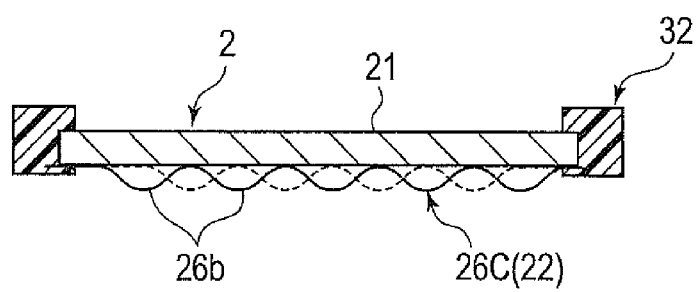

The negative electrode 2 of the air cell shown in FIG. 10 includes the negative electrode current collecting layer 22 which is formed of a negative electrode current collecting member 26C in a manner such that the air flow paths F are formed along the surface of the positive electrode 1 of the adjacent air cell when the plural air cells are connected in series. In the negative electrode 2, the outer peripheries of the negative electrode metal layer 21 and the negative electrode current collecting member 26C are integrated with the second outer frame member 32.

The negative electrode current collecting member 26C is provided with a plurality of projections 26b projecting on the lower surface thereof and arranged in both vertical and horizontal directions. The negative electrode 2 includes this negative electrode current collecting member 26C. The negative electrode current collecting member 26C also forms the air flow paths F for the positive electrode 1 and functions as a spacer and a connector as in the case of the above-described embodiments.

Figure 11A:
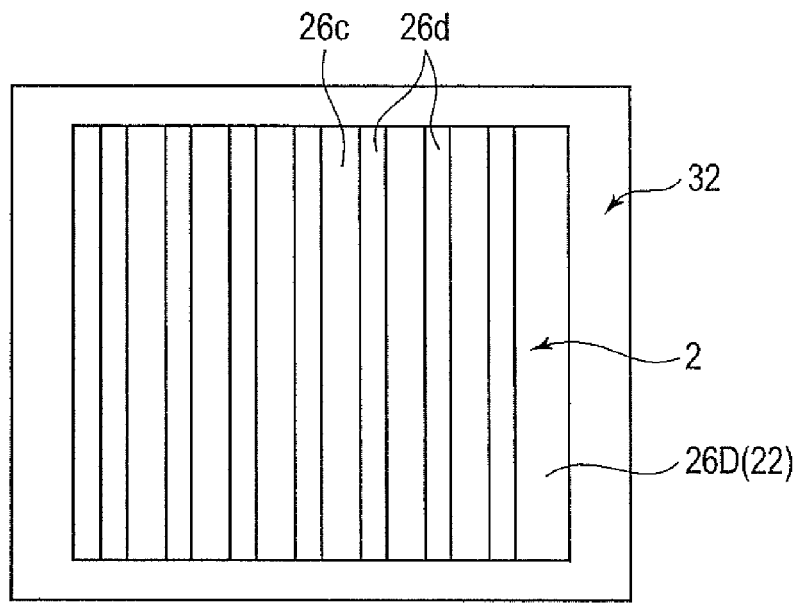
FIG. 11($a$) is a bottom view showing still another example of the negative electrode of the air cell according to the present embodiment, and FIG. 11($b$) is a cross-sectional view of this negative electrode.
Figure 11B:
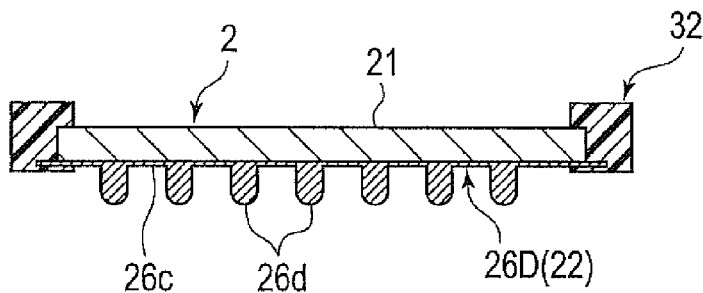

The negative electrode 2 of the air cell shown in FIG. 11 includes the negative electrode current collecting layer 22 which is formed of a negative electrode current collecting member 26D in a manner such that the air flow paths F are formed along the surface of the positive electrode 1 of the adjacent air cell when the plural air cells are connected in series. In the negative electrode 2, the outer peripheries of the negative electrode metal layer 21 and the negative electrode current collecting member 26D are integrated with the second outer frame member 32.

The negative electrode current collecting member 26D is provided with a plurality of projections projecting downward and integrated with the negative electrode current collecting layer 22. The negative electrode current collecting member 26D includes a flat body portion 26c joined to the negative electrode metal layer 21 and a plurality of rib projections 26d projecting from the body portion 26c. FIG. 11 shows the seven rib projections 26d. The rib projections 26d are arranged in parallel at predetermined intervals.

The negative electrode 2 includes this negative electrode current collecting member 26D. The negative electrode current collecting member 26D also forms the air flow paths F for the positive electrode 1 and functions as a spacer and a connector as in the case of the above-described embodiments.

Figure 12A:
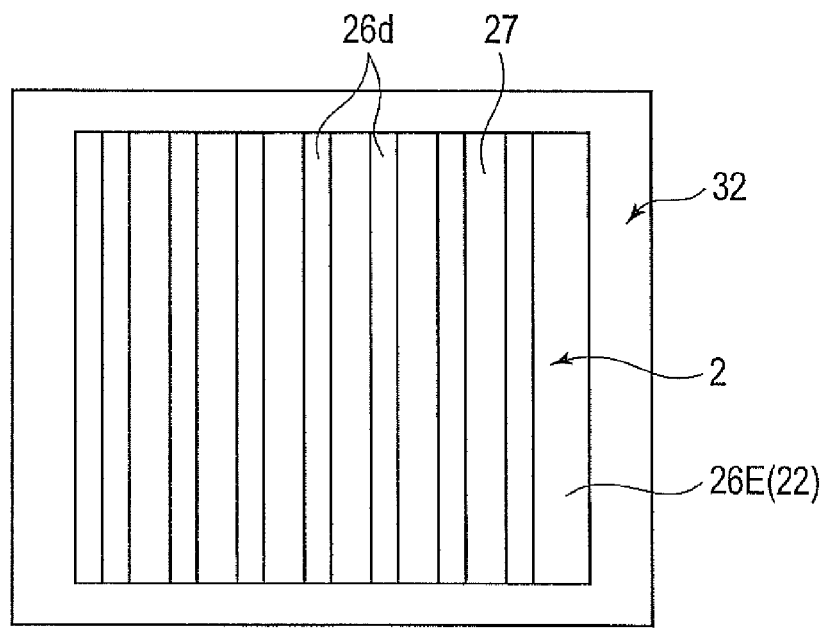
FIG. 12($a$) is a bottom view showing still another example of the negative electrode of the air cell according to the present embodiment, and FIG. 12($b$) is a cross-sectional view of this negative electrode.
Figure 12B:
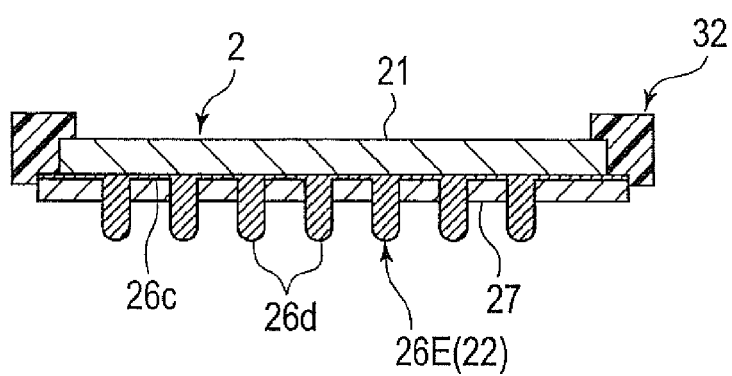

The negative electrode 2 of the air cell shown in FIG. 12 includes a negative electrode current collecting member 26E obtained in a manner such that the air flow paths F are formed along the surface of the positive electrode 1 of the adjacent air cell. The negative electrode current collecting member 26E includes, as in the case of the embodiment shown in FIG. 11, a flat body portion 26c joined to the negative electrode metal layer 21 and a plurality of (seven in the figure) rib projections 26d projecting from the body portion 26c. The negative electrode current collecting member 26E includes a support layer 27 joined to the body portion 26c in the state where the respective rib projections 26d penetrate the support layer 27.

The negative electrode 2 includes this negative electrode current collecting member 26E. The negative electrode current collecting member 26E also forms the air flow paths F for the positive electrode 1 and functions as a spacer and a connector as in the case of the above-described embodiments. In addition, since the body portion 26c is reinforced by the support layer 27, the negative electrode 2 can achieve a further reduction in thickness and weight of the body portion 26c and can be prevented from being bent when the negative electrode metal layer 21 is worn out.

The negative electrode 2 of the air cell shown in each of FIG. 7 to FIG. 12 includes the negative electrode current collecting member (23A, 26B, 26C, 26D, 26E) formed spatially in the thickness direction to define the air flow paths F, so that the mechanical strength can be improved due to the own configuration of the negative electrode current collecting member. Here, since the air flow paths F are essential between the air cells 10 adjacent to each other, there is no risk of an increase in thickness of the respective air cells 10 even if the negative electrode current collecting member is formed spatially in the thickness direction. Further, the use of the negative electrode current collecting member can contribute to electrically connecting the air cells 10 adjacent to each other without using wires. Accordingly, a decrease in internal resistance and a decrease in the number of parts can be achieved, and an increase in output power and a reduction in cost of the air cells 10 and the assembled battery 100 can also be achieved.

Further, the negative electrode current collecting material (26A, 26B) shown in FIG. 7 or FIG. 9 uses, as the air flow paths F, the spaces between the adjacent elongated protrusions 26a or the dip portions on the lower side of the wave configuration. When the elongated protrusions 26a or the top portions on the lower side of the wave configuration are provided with a plurality of pores, the groove portions on the rear side of the elongated protrusions 26a or the dip portions on the upper side of the wave configuration can also be used as the air flow paths F.

Figure 13:
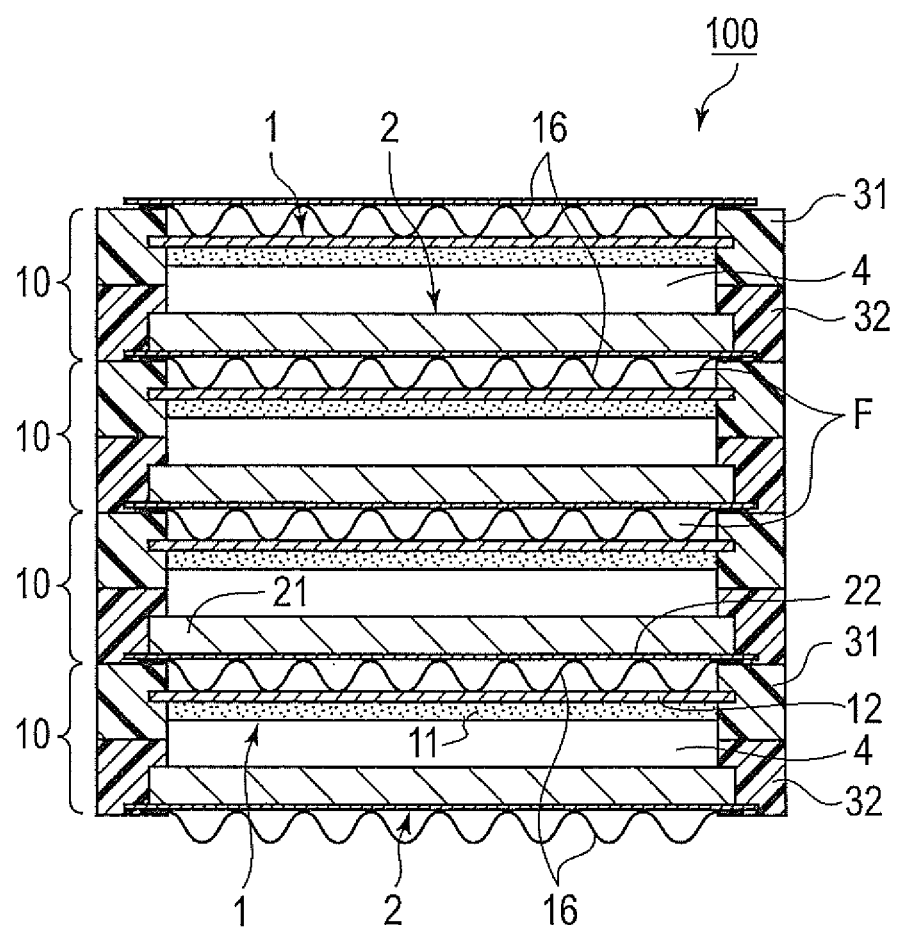
FIG. 13 is a cross-sectional view showing another example of the assembled battery in which the plural air cells are stacked.

The air cell 10 shown in FIG. 13 includes the positive electrode 1 having electric conductivity on the surface thereof. The positive electrode 1 shown in the figure includes a positive electrode current collecting layer 16 located on the upper side of the water-repellent layer 12 so as to ensure the electric conductivity on the positive electrode surface due to the positive electrode current collecting layer 16. The positive electrode current collecting layer 16 has air-permeability for supplying air to the water-repellent layer 12. In particular, the positive electrode current collecting layer 16 may employ, as in the case of the reinforcing layer 5, a porous metal plate such as perforated metal or a metal mesh, or a porous resin plate or a resin mesh covered with metal such as plating on the surface thereof.

As shown in FIG. 13, the plural air cells 10 are stacked on top of each other to constitute the assembled battery 100, and the air flow paths F are formed between the air cells 10 adjacent to each other. The positive electrode current collecting layer 16 is in contact with the adjacent negative electrode 2 to function as a spacer and a connector. The positive electrode current collecting layer 16 in the air cell 10 may be integrated with the first outer frame member 31.

The air cell 10 including the positive electrode 1 described above can also achieve an increase in mechanical strength, a reduction in thickness and weight, a reduction in internal resistance and an increase in output power, as in the case of each embodiment described above. The air cell 10 according to this embodiment includes the positive electrode 1 having electric conductivity on the surface thereof. Therefore, in addition to the positive electrode 1 including the positive electrode current collecting layer 16 described above, the positive electrode 1 including the water-repellent layer 12 having electric conductivity may be employed in the assembled battery 100 shown in FIG. 8.

Although the present invention has been described above by reference to the embodiments, the present invention is not limited to the descriptions thereof, and it will be apparent to those skilled in the art that various modifications and improvements can be made. Although the respective embodiments have exemplified the case that the positive electrode 1 and the negative electrode 2 are integrated with the first outer frame member 31 and the second outer frame member 32 respectively, the outer peripheries of the positive electrode 1 and the negative electrode 2 may be integrated with a single outer frame member in a manner such that the storage portion for the electrolysis solution is formed between the positive electrode 1 and the negative electrode 2.

The air cell according to the present invention can increase the mechanical strength of at least the positive electrode and improve the sealing performance for the electrolysis solution and thereby contribute to a reduction in thickness so that the air cell is suitably mounted in a vehicle.

The invention claimed is:

1. An air cell comprising:
   a positive electrode;
   a negative electrode comprising a negative electrode metal layer and a negative electrode current collecting member; and
   an outer frame member having a first outer frame integrally joined to an outer periphery of the positive electrode and a second outer frame integrally joined to an outer periphery of the negative electrode current collecting member, the outer frame member providing a sealed storage portion for an electrolysis solution formed between the positive electrode and the negative electrode metal layer, wherein:
      the negative electrode current collecting member includes a flat body portion joined to the negative electrode metal layer, elongated protrusions projecting from the flat body portion facing an adjacent positive electrode and being arranged in parallel at predetermined intervals, and a support layer joined to the body portion in a state where the elongated protrusions penetrate the support layer;
      the negative electrode current collecting member is obtained in a manner such that an air flow path is formed on a surface of the positive electrode of the air cell adjacent thereto when a plurality of air cells are connected in series; and
      the negative electrode current collecting member contains a material having electrolysis solution resistance higher than that of the negative electrode metal layer.

2. The air cell according to claim 1, wherein the outer frame member is made of resin and is integrated with at least one of the outer peripheries of the positive electrode and the negative electrode.

3. The air cell according to claim 1, wherein the outer frame member includes an electrode fixing structure to mechanically fix at least one of the positive electrode and the negative electrode.

4. The air cell according to claim 1, wherein the positive electrode includes a reinforcing layer.

5. The air cell according to claim 4, wherein the reinforcing layer has electric conductivity.

6. The air cell according to claim 1, wherein the positive electrode includes a water-repellent layer, a catalyst layer and a reinforcing layer stacked on top of each other, and at least one of the water-repellent layer, the catalyst layer and the reinforcing layer is integrally joined to the outer frame member.

7. The air cell according to claim 1, wherein the negative electrode metal layer and the negative electrode current collecting member are integrated together.

8. The air cell according to claim 1, wherein the negative electrode current collecting member has a dimension in a manner such that an outer periphery thereof extends to an outside of the negative electrode metal layer in a planar view.

9. The air cell according to claim 1, wherein the surface of the positive electrode has electric conductivity.

10. An assembled battery comprising more than one air cell according to claim 1, the more than one air cell being stacked on top of each other.

11. An air cell comprising:
    a positive electrode and a negative electrode; and
    an outer frame member located at outer peripheries of the positive electrode and the negative electrode, the positive electrode and the negative electrode, and the outer frame member being integrally joined together,
    wherein the negative electrode comprises a negative electrode current collecting member having elongated protrusions projecting on a surface facing an adjacent positive electrode, the elongated protrusions arranged in parallel at predetermined intervals, and
    the negative electrode current collecting member includes a flat body portion joined to the negative electrode metal layer, the elongated protrusions projecting from the body portion, and a support layer joined to the body portion in a state where the elongated protrusions penetrate the support layer.

12. An air cell comprising:
    a positive electrode and a negative electrode; and
    an outer frame member located at outer peripheries of the positive electrode and the negative electrode,
    the outer frame member includes a first outer frame member integrally joined to the positive electrode, and a second outer frame member integrally joined to the negative electrode and having different structure from the first outer frame member,
    wherein the negative electrode comprises a negative electrode current collecting member having elongated protrusions projecting on a surface facing an adjacent positive electrode, the elongated protrusions arranged in parallel at predetermined intervals, and
    the negative electrode current collecting member includes a flat body portion joined to the negative electrode metal layer, the elongated protrusions projecting from the body portion, and a support layer joined to the body portion in a state where the elongated protrusions penetrate the support layer.

* * * * *